US011845142B2

(12) United States Patent
Schueddekopf

(10) Patent No.: US 11,845,142 B2
(45) Date of Patent: Dec. 19, 2023

(54) TOOL FOR FRICTION STIR WELDING AND METHOD FOR PRODUCING PANELS

(71) Applicant: Nemak, S.A.B. de C.V., Garcia (MX)

(72) Inventor: Sven Schueddekopf, Frankfurt (DE)

(73) Assignee: Nemak, S.A.B. de C.V., Nuevo Leon (MX)

( * ) Notice: Subject to any disclaimer, the term of this patent is extended or adjusted under 35 U.S.C. 154(b) by 56 days.

(21) Appl. No.: 17/431,459

(22) PCT Filed: Feb. 14, 2020

(86) PCT No.: PCT/IB2020/051252
§ 371 (c)(1),
(2) Date: Aug. 17, 2021

(87) PCT Pub. No.: WO2020/170098
PCT Pub. Date: Aug. 27, 2020

(65) Prior Publication Data
US 2022/0134470 A1    May 5, 2022

(30) Foreign Application Priority Data
Feb. 19, 2019  (DE) ..................... 10 2019 104 134.1

(51) Int. Cl.
*B23K 20/00*     (2006.01)
*B23K 20/12*     (2006.01)
*B23K 101/04*    (2006.01)

(52) U.S. Cl.
CPC ........ *B23K 20/1225* (2013.01); *B23K 20/126* (2013.01); *B23K 2101/045* (2018.08)

(58) Field of Classification Search
CPC .............. B23K 20/125; B23K 20/1255; B23K 37/0408; B23K 37/047
See application file for complete search history.

(56) References Cited

U.S. PATENT DOCUMENTS

| 7,793,816 B2 * | 9/2010 | Burg ..................... B23K 20/126 228/2.1 |
| 7,854,362 B2 * | 12/2010 | Stol ..................... B23K 20/125 228/112.1 |

(Continued)

FOREIGN PATENT DOCUMENTS

| CN | 101970167 A | 2/2011 |
| CN | 204621384 U | 9/2015 |

(Continued)

*Primary Examiner* — Erin B Saad
(74) *Attorney, Agent, or Firm* — THE WEBB LAW FIRM

(57) ABSTRACT

The invention makes available a tool for friction stir welding, which makes it possible, with reduced effort, to connect two panel elements that butt up against one another with one another by means of friction stir welding, in the case of which a tunnel is formed in the region of the abutting side surfaces, by means of recesses formed in the manner of a channel in the side surfaces in question. For this purpose, the tool has a central axle configured in the manner of a pin, provided for coupling to a drive device, a first friction shoulder carried by the central axle, a second friction shoulder carried by the central axle at a distance from the first friction shoulder in the longitudinal direction of the central axle, two support shoulders carried by the central axle, arranged between the friction shoulders, one of which is mounted on the central axle in an axially displaceable manner, and an elastic element that is arranged between the support shoulders and exerts an elastic force the axially displaceable support shoulder, which force is directed to the friction shoulder most closely adjacent, in each instance, to the axially displaceable support shoulder in the direction. According to the invention, the setting device includes a setting element that is driven outward, away from the central axle of the tool, in the radial direction, during use, by means of the centrifugal forces that are then in effect, and, during (Continued)

this process, acts against a slanted surface formed on the support shoulder, in each instance.

12 Claims, 3 Drawing Sheets

(56) References Cited

U.S. PATENT DOCUMENTS

| | | | |
|---|---|---|---|
| 9,604,306 B2* | 3/2017 | Kato | B23K 20/122 |
| 9,791,329 B1* | 10/2017 | Catalano | G01L 1/00 |
| 10,239,152 B2* | 3/2019 | Carlson | B23K 20/1265 |
| 2006/0065694 A1 | 3/2006 | Stol et al. | |
| 2009/0230173 A1 | 9/2009 | Stol et al. | |
| 2012/0248174 A1* | 10/2012 | dos Santos | B23K 20/126 |
| | | | 228/2.1 |
| 2016/0074957 A1* | 3/2016 | Nishida | B23K 20/123 |
| | | | 228/114.5 |
| 2022/0134470 A1* | 5/2022 | Schueddekopf | B23K 20/1225 |
| | | | 228/112.1 |

FOREIGN PATENT DOCUMENTS

| | | |
|---|---|---|
| DE | 102005030800 A1 | 1/2007 |
| EP | 2995411 A1 | 3/2016 |
| JP | 2003260574 A | 9/2003 |
| JP | 200442115 A | 2/2004 |
| JP | 200812550 A | 1/2008 |
| JP | 2012250277 A | 12/2012 |

\* cited by examiner

TOOL FOR FRICTION STIR WELDING AND METHOD FOR PRODUCING PANELS

CROSS-REFERENCE TO RELATED APPLICATIONS

This application is the United States national phase of International Application No. PCT/IB2020/051252 filed Feb. 14, 2020, and claims priority to German Patent Application No. 10 2019 104 134.1 filed Feb. 19, 2019, the disclosures of which are hereby incorporated by reference in their entirety.

BACKGROUND OF THE INVENTION

Field of the Invention

The invention relates to a tool for friction stir welding, wherein the tool comprises a central axle that is configured in the manner of a pin and intended for coupling to a drive device, a first friction shoulder that is carried by the central axle, a second friction shoulder that is carried by the central axle at a distance from the first friction shoulder in the longitudinal direction of the central axle, two support shoulders carried by the central axle, which shoulders are arranged between the friction shoulders, and at least one of which is mounted on the central axle in an axially displaceable manner, and a setting device that is arranged between the support shoulders and set up for exerting a force, during use, at least on the axially displaceable support shoulder, which force is directed in the direction of the friction shoulder arranged most closely adjacent, in each instance, to the axially displaceable support shoulder.

Description of Related Art

Likewise, the invention relates to a method for producing panels from panel elements that are pre-fabricated from a weldable material, wherein the panel elements are friction stir welded using a tool of the type indicated above.

A tool of this type is known from EP 2 995 411 A1. In the case of this tool, a combination of plate springs that apply an elastic force directed in the direction of the assigned friction shoulder, in each instance, to the axially displaceable support shoulders, serves as the setting device.

A summary of tools for friction stir welding known from the further prior art is contained in DE 102005030800 A1. As explained there and described in greater detail in WO 93/10935, the workpieces to be welded to one another are brought into contact for friction stir welding. A pin of a friction stir welding tool driven to rotate about its longitudinal axis is introduced into the joining zone formed between the workpieces in this manner, until a shoulder arranged on the tool above the welding pin sits on the surface of the workpieces. During this process, friction heat is generated by means of the relative movement between the pin and the workpieces, so that the material regions of the workpieces that are adjacent to one another in the joining zone assume a plasticized state, and the material of the workpieces is mixed together in the joining zone. The tool is continuously moved along the connection line between the workpieces to be welded to one another while the rotating welding pin stands in contact with the material present in the joining zone, so that the material situated around the welding pin is softened, mixed, and subsequently solidified in a continuously progressing process. As is further explained in DE 10 2005 030 800 A1, it can be practical, depending on the welding task to be accomplished, in each instance, to couple the friction shoulder with the rotational movement of the welding pin, so as to bring about the most intensive working of the joining zone possible. In the case of other applications, however, it can also be practical to uncouple the friction shoulder from the rotation of the welding pin, so as to minimize the risk of the formation of distortion in the joining zone. At the same time, the welding pin can also be configured to be adjustable in the axial direction, so as to be able to adapt the depth to the material thickness that is present, in each instance, with which the welding pin is immersed in the material of the workpieces to be welded to one another.

Aside from the prior art as explained above, a multi-shoulder friction stir welding tool is known from US 2009/0230173 A1, which has a central axle that is intended for coupling to a drive device. The central axle is configured as a threaded rod and carries two friction stir modules as well as shoulders assigned to the friction stir modules, in each instance. The shoulders and friction stir modules are oriented coaxially to the central axle and coupled with the central axle by way of threads that correspond to the threads of the axle. In this way the relative position of the friction stir modules and of the shoulders can be adjusted by means of rotation of the central axle or of the components in question. At the same time, rotational drive of the friction stir modules and of the shoulders, for friction stir welding of sheet metal components that butt up against one another, takes place by way of the central axle.

Typically, panel elements for welding of which a tool according to the invention is particularly suitable, and from which large-area panels can be produced using a method according to the invention, are produced from a light metal material and butt-joined. Specifically between abutting panel elements, a weld connection can be produced particularly quickly and efficiently by means of friction stir welding.

In this regard, a particular challenge exists if the panel elements have channel-like recesses on their side surfaces that abut one another in the joined state, which recesses form a tunnel when the panel elements are butt-joined, which tunnel is delimited on its tip side and its underside, in each instance, in the case of horizontal orientation of the panel elements, by a material section that projects laterally away from the panel elements, and as such is not accessible from the top side and underside of the panel elements.

In the case of panel elements structured in this way, it is not possible to guarantee proper welding using conventional friction stir tools, which act on the butt-joined panel elements to be welded together only from the free top side or underside, in each instance, with reference to a horizontal orientation of the panel elements. Thus, when using such conventional tools, which can be applied to the panel elements only from the outside, a counter-bearing is missing, which ensures that the material of the friction stir welded material sections of the panel elements is heated to a sufficient degree for proper welding, and consequently that the materials of the panel elements mix sufficiently in the region of the welding zone.

In order to solve this problem, and in order to obtain a smooth weld seam with even surfaces when welding panel elements of the type explained above, in JP 2004/042115 A the use of spool-like friction stir tools has been proposed, in the case of which a friction shoulder, in each instance, and, at a distance from it in the axial direction, a support shoulder are arranged on a central axle. In this regard, the distance between the support shoulder and the friction shoulder is adjusted in such a manner that it corresponds to the thickness of the material sections that abut one another in the joining zone between the panel elements and delimit the tunnel between the panel elements. During welding operation, the central axle of the tool forms the welding pin that is guided along the joining seam between the material sections of the panel elements to be welded to one another. Since the friction shoulder and the support shoulder are connected with the central axle in a torque-proof manner, in each instance, friction heat is generated by way of the friction shoulder that sits on the free top side of the abutting material sections of the panel elements during welding operation, on the one hand, and by means of the support shoulder that lies against the surface of the material sections assigned to the tunnel between the panel elements, on the other hand. In order to guarantee optimal support during the welding process, the press-down force exerted by the support shoulder is greater than that exerted by the friction shoulder against the free surface of the side. By moving a tool structured in the manner explained above in this way, in each instance, along the upper joining seam, in the case of horizontal orientation of the panel elements to be welded to one another, and along the joining seam that lies at the bottom in the case of this orientation, it is possible to weld the panel elements to one another in one pass, although the tunnel formed in the region of the abutting side surfaces is inaccessible over its length.

Against the background of the state of the art as explained above, the task has arisen of creating a tool for friction stir welding that makes it possible, with reduced effort, to connect two butt-joined panel elements with one another by means of friction stir welding, with a tunnel being formed in the region of the abutting side surfaces, by means of recesses formed in the side surfaces in question, in channel-like manner.

Furthermore, a method is supposed to be indicated, which makes it possible, in a simple manner, to friction stir weld panel elements that are configured in such a manner and have been butt-joined.

The invention has accomplished this task by means of a tool that has at least the characteristics and a method that comprises at least the method steps as described herein.

Advantageous embodiments of the invention are indicated in the dependent claims and will be explained in detail below, as will the general idea of the invention.

SUMMARY OF THE INVENTION

A tool for friction stir welding, according to the invention, accordingly comprises, in agreement with the prior art explained initially,
- a central axle that is configured in the manner of a pin and is intended for coupling to a drive device,
- a first friction shoulder that is carried by the central axle,
- a second friction shoulder that is carried by the central axle at a distance from the first friction shoulder, in the longitudinal direction of the central axle,
- two support shoulders carried by the central axle, which are arranged between the friction shoulders and at least one of which is mounted on the central axle in an axially displaceable manner, and
- a setting device that is arranged between the support shoulders and set up for exerting a force on the axially displaceable support shoulder, during use, which force is directed in the direction of the friction shoulder arranged most closely adjacent to the axially displaceable support shoulder, in each instance.

According to the invention, the setting device now comprises a setting element that is driven, during use, by means of the centrifugal forces then in effect, in the radial direction, outward away from the central axle of the tool, and, during this process, acts against a slanted surface formed on the support shoulder, in each instance.

The setting device provided according to the invention is therefore configured in the manner of a centrifugal clutch, and acts as a function of the speed of rotation of the tool. For this purpose, the setting device comprises a setting element that is driven, during use, by means of the centrifugal forces that act on this setting element, in the radial direction, to the outside away from the central axle of the tool, and, in this regard, acts against a slanted surface formed on the support shoulder, in each instance. The radial movement of the setting element is thereby deflected into an axial movement directed against the friction shoulder most closely adjacent to it. In this way, great press-down forces are generated from the high speeds of rotation with which the friction stir tools of the type in question here are driven, which forces have an advantageous effect on the progression of welding and the welding result of friction stir welding.

In practical use, the central axle of a tool according to the invention acts as a welding pin, by means of which so much heat is introduced by means of friction, over the height of the joining seams present between the abutting panel elements, so that the material softens and mixes in the region of the joining zone between the panel elements, and thereby enters into an intensive material-fit connection, by means of which the panel elements are firmly connected with one another after solidification. In this process, the central axle carries two support shoulders that are situated, during use, in the tunnel present between the panel elements to be welded to one another, and from there support the material sections that delimit the tunnel on its top side and underside in the case of a horizontal orientation of the panel elements, during the friction stir welding process. In this regard, the supporting force is generated by way of a setting device that is arranged between the support shoulders and, during use, presses at least one support shoulder, which is mounted on the central axle in an axially movable manner, against the surface of the material section assigned to it, which faces the tunnel. In this way, it is ensured, independent of the material thickness of the material section, in each instance, and without complicated adjustment work, that the axially displaceable support shoulder supports the material section assigned to it with the required press-down force, in each instance.

The second shoulder can be fixed in place in its axial position on the central axle in such a manner that it presses against the other material section, in each instance, with a firmly set press-down force, from the tunnel, and in this way it develops a sufficient support effect.

However, an embodiment of the tool according to the invention proves to be particularly suitable for practice here, in which the two support shoulders are mounted on the central axle in an axially displaceable manner, and, during use, have a force applied to them, by means of a setting device, in each instance, in the direction toward the friction shoulder arranged most closely to them, in each instance. In the case of a tool structured in this way, any adjustment effort for setting the press-down forces applied by the support shoulders is eliminated. Instead, the support shoulders act, in each instance, with a defined force generated by means of the setting device, in each instance, against the surface of the material sections assigned to them, in each instance, facing the tunnel. In this regard, the elastically resilient application of force proves to be particularly advantageous, because in this manner, variations of the thickness of the material sections of the panel elements to be welded to one another can easily be balanced out.

As has already been mentioned, the central axle serves as a friction stir pin during use, by way of which the required heat energy is introduced, by means of friction, into the material that laterally delimits the joining seam, in each instance, between the panel elements to be welded to one another. For this purpose, the central axle can be provided with a surface structure on its circumferential surfaces, which structure increases the friction between the material of the panel elements to be friction stir welded that comes into contact with the central axle. Likewise, the shaping of the central axle can be selected in such a manner that optimal introduction of energy into the material in question is achieved. For this purpose, the central axle can have a cross-sectional shape that deviates from a circle. Thus, for example, polygonal cross-sections, in particular triangular or other polygonal cross-sections are conceivable, so that edges are formed on the circumferential surface of the axle, which edges not only increase the friction between the material of the panels to be welded, but also can be used, if necessary, for torque-proof coupling of the support shoulders or friction shoulders to the central axle.

In this regard, the central axle does not necessarily have to be produced from a single piece. Instead, it is also possible to compose the central axle from one or more components. This can have the advantage that the components in question can be shaped in accordance with their function. Thus, for example, the central axle can have a special surface structure or special mechanical properties in the region in which the central axle comes into contact with the material of the material sections that delimit the joining seams, while it can be configured in a manner optimal for the purpose in the region in which the support shoulders are axially displaceable. In this regard, the individual sections of the central axle can be formed from individual components that possess properties or shaping in accordance with their functions, in each instance.

In the case of a tool according to the invention, as well, it can be practical for the introduction of maximum friction heat into the joining zone in which the welded connection is supposed to be formed to couple at least one of the support shoulders with the central axle in a torque-proof manner.

For the same reasons, it can be practical to couple at least one of the friction shoulders with the central axle in a torque-proof manner.

However, cases of use can also occur in which it is practical, for the reasons already known from the prior art discussed initially, to uncouple the support shoulders or the friction shoulders from the rotational movement of the central axle, so that the rotation-uncoupled support shoulder or friction shoulder, in each instance, does not perform a rotation about the longitudinal axis of the central axle during use.

In particular if the support shoulders or friction shoulders are uncoupled from the rotational movement of the central axle, the support shoulders or friction shoulders can also be configured in the manner of a shoe-shaped step or the like, so as to bring about large-area support or friction stress of the joining zone between the panel elements to be welded to one another. Also, it is possible to configure at least one of the support shoulders in such a manner that the support shoulder in question runs along the lateral delimitation surfaces of the tunnel formed between the abutting panel elements, and the central axle is supported in this way.

An optimal distribution of stress occurs in the case of a tool according to the invention, during use, if the friction shoulders, the support shoulders, and the at least one elastic element are oriented coaxially with reference to the central axle. This particularly holds true if at least one of the friction shoulders or one of the support shoulders is connected with the central axle in a torque-proof manner.

Likewise, it proves to be advantageous in the case that at least one of the friction shoulders or one of the support shoulders is connected with the central axle in a torque-proof manner, if the end faces of the friction shoulders or support shoulders that come in contact with the material of the panel elements are in the shape of ring disks, and the central axle is passed through the center of the end faces formed in this way.

In accordance with the above explanations regarding the tool according to the invention, the method according to the invention, for producing panels that are composed of two panel elements pre-fabricated from weldable material, which panels have a recess that extends in the manner of a channel on side surfaces that are assigned to one another, in each instance, along the side surface in question comprises the following work steps:

making the two panel elements available;
 joining the panel elements in such a manner that their side surfaces, provided with the channel-like recesses, butt up against one another, in particular in a butt-jointed manner, in a joining zone, and in the joining zone, a tunnel that extends longitudinally along the joining zone is formed by the channel-like recesses, which tunnel is delimited, in the case of horizontal orientation of the panel elements, by material sections of the panel elements on its top side and its underside, in each instance, that project away laterally from the corresponding panel in the manner of crosspieces, of which the material sections assigned to the top side butt up against one another in a first joining seam, and the material sections assigned to the underside butt up against one another in a second joining seam,
 friction stir welding of the panel elements, in that a configured tool is guided centrally along the joining seams between the panel elements with its central axle, which acts as a stirring pin, wherein the one friction shoulder acts on the free surface on the top side, and the other friction shoulder acts on the free surface on the underside, and at least one of the support shoulders is elastically pressed against the surface of two abutting material sections of the panel elements, which surface faces the tunnel.

In the event that the support shoulders are coupled with the central axle in a torque-proof manner, the material sections of the abutting panel elements that are to be welded to one another during friction stir welding are subjected to friction stir welding, in each instance, both from their free outer surface that faces away from the tunnel, between the panel elements, and from the surface that faces the tunnel.

A tool according to the invention and a method according to the invention are particularly suitable for friction stir welding of panel elements that consist of a light metal material, in particular an aluminum material.

BRIEF DESCRIPTION OF THE DRAWINGS

In the following, the invention will be explained in greater detail using an exemplary embodiment shown in a drawing.

The figures show, schematically, in each instance.

DESCRIPTION OF THE INVENTION

Figure 1:
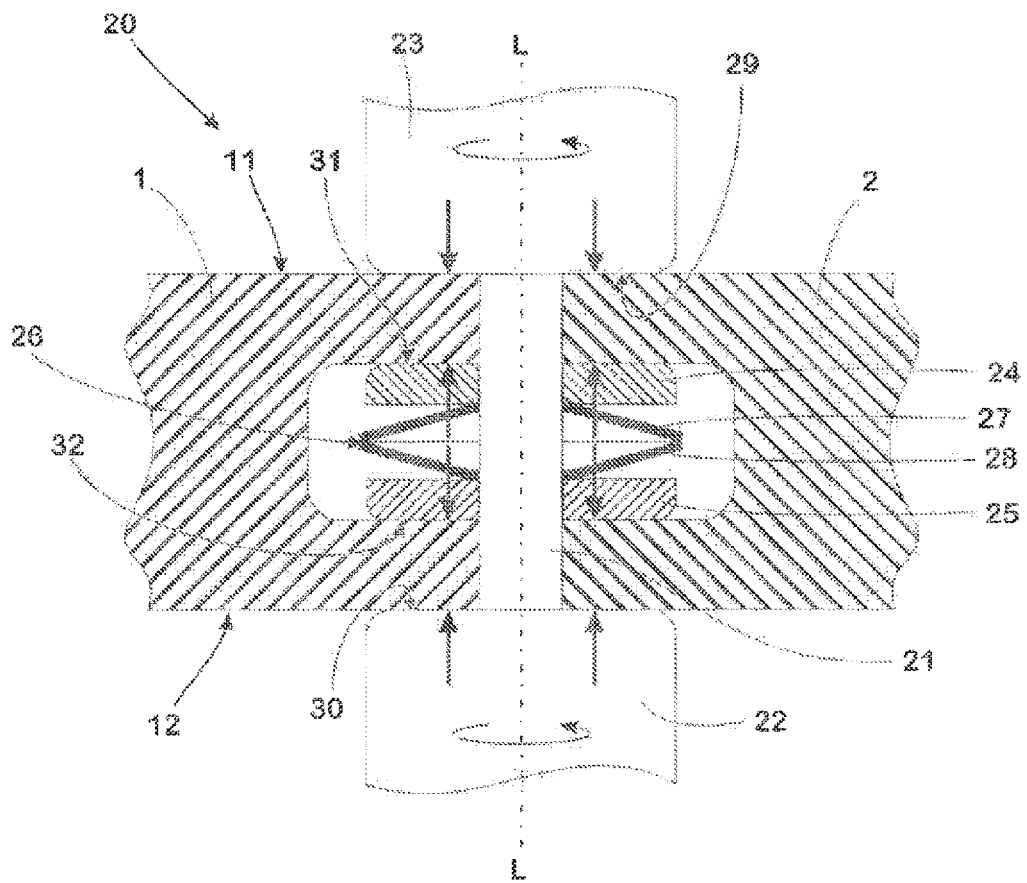
FIG. 1 a tool according to the state of the art during welding of two horizontally oriented panel elements, in cross-section.
Figure 2:
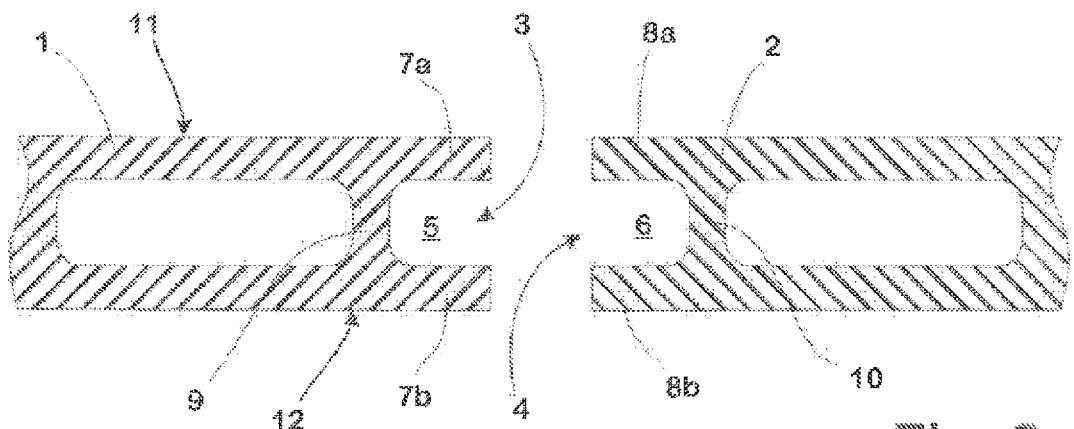
FIG. 2 the panel elements made available for welding, in a horizontal orientation, in a view corresponding to FIG. 1.

The panel elements 1, 2 are pre-fabricated in a conventional manner, for example by means of extrusion, as hollow-chamber profiles, from an aluminum material known for this purpose from the state of the art. Channel-like recesses 5, 6 are formed in the side surfaces of their longitudinal sides 3, 4, in each instance, which recesses extend over the length of the longitudinal side 3, 4 in question, and are delimited, in the case of the horizontal orientation selected in the figures, on their top side and lower side, in each instance, by a material section 7a, 7b, 8a, 8b of the corresponding panel element 1, 2. In this regard, the base of the channel-like recesses 5, 6 is formed by a crosspiece 9, 10, in each instance, of the corresponding panel element 1, 2, of the side surfaces assigned to the corresponding longitudinal side 3, 4, so that the recesses 5, 6 have a U-shaped cross-sectional shape.

Figure 3:
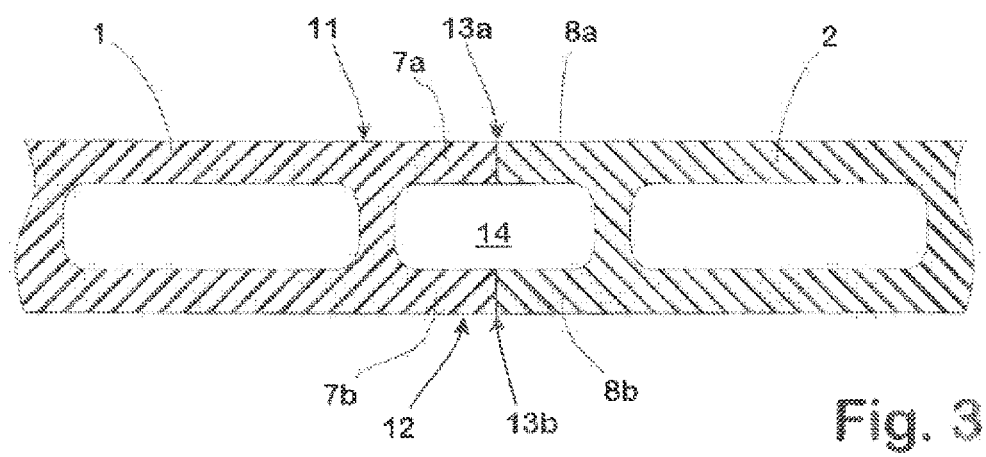
FIG. 3 the panel elements according to FIGS. 1 and 2, butt-joined, in a view corresponding to FIG. 1.

For welding, the panel elements 1, 2 are butt-joined (FIG. 3), in that their longitudinal sides 3, 4 are oriented to butt up against one another, in such a manner that the outer surfaces 11, 12 of the panel elements 1, 2 lie in one plane, and the end faces of their upper material sections 7a, 8a, in the case of horizontal orientation of the panel elements 1, 2, touch one another in an upper joining seam 13, and their lower material sections 7b, 8b touch one another in a lower joining seam 13b.

The recesses 5, 6 of the panel elements 1, 2 form a tunnel 14 between the panel elements 1, 2 that butt up against one another in this way, which tunnel 14 is delimited, in the case of the horizontal orientation selected in FIGS. 1-4, on its top side by the material sections 7a, 8a, and on its underside by the material sections 7b, 8b of the panel elements 1, 2.

Figure 4:
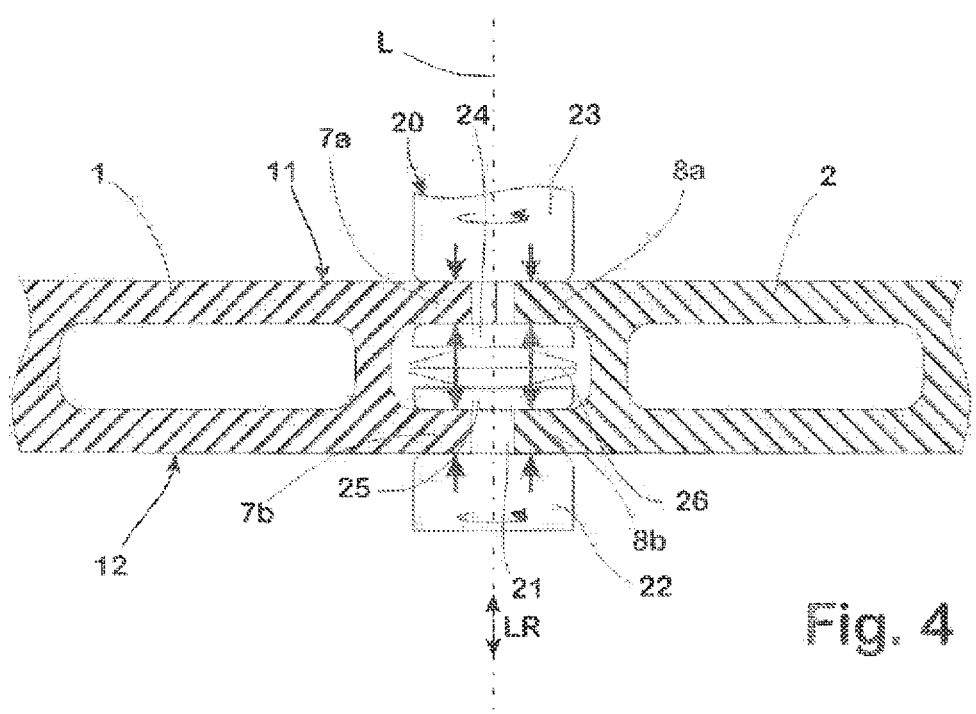
FIG. 4 the panel elements according to FIGS. 1 to 3, during friction stir welding by means of the tool shown in FIG. 1, in a view corresponding to FIGS. 1 to 3.

The tool 20 shown in FIGS. 1 and 4, corresponding to the state of the art as explained initially, for friction stir welding, has a central axle 21 configured in the manner of a welding pin provided in the case of conventional friction stir welding tools, which axle is coupled to a conventionally configured rotational drive, not shown here. The rotational drive, not shown, drives the central axle 21 so that it rotates about its longitudinal axis L.

At the lower end of the central axle 21, a first friction shoulder 22 is held in a torque-proof connection with the central axle 21. A second friction shoulder 23 is also held on the central axle 21 in a torque-proof connection, offset in the longitudinal direction of the central axle 21. In this regard, the second friction shoulder 23 is equipped with a releasable setting device, not shown here, by means of which the position of the friction shoulder 23 on the central axle 21 is fixed in place. After release of its setting device, the friction shoulder 23 can be adjusted in the longitudinal direction LR of the central axle 21.

Two support shoulders 24, 25 are arranged on the central axle 21, between the two friction shoulders 22, 23. In this regard, the support shoulders 24, 25 are displaceable in the longitudinal direction LR, and mounted on the central axle 21 in a torque-proof connection.

In the case of the tool corresponding to the state of the art shown in FIGS. 1 and 4, the support shoulders 24, 25 have an elastic force applied to them by means of a setting device 26 arranged between them, which is configured as an elastic element, in the direction toward the friction shoulder 22, 23 most closely adjacent to them. For this purpose, the setting device 26 is formed by a package of plate springs 27, 28, which are oriented relative to one another in such a manner that the support shoulder 24 is pressed in the direction of the friction shoulder 22, and the support shoulder 25 is pressed in the direction of the friction shoulder 23.

The friction shoulders 22, 23, the support shoulders 24, 25, and the plate springs 27, 28 that form the setting device 26 are oriented coaxially relative to the central axle 21, and are formed, in each instance, in such a manner that the central axle 21 can be passed through them. Accordingly, ring-shaped planar contact surfaces 29, 30, 31, 32 are formed on the end faces of the friction shoulders 22, 23 and of the support shoulders 24, 25 that are assigned to one another, and the central axle 21 runs through their center.

To start friction stir welding, the tool 20 is positioned at a laterally open end of the tunnel 14 and set up so that in the case of horizontal orientation of the butt-joined panel elements 1, 2, its first friction shoulder 23 sits on the lower outer surface 12 of the panel element 1, 2, in the case of horizontal orientation of the panel elements 1, 2, and the upper friction shoulder 22 sits on the upper outer surface 11 of the panel elements 1, 2. At the same time, the support shoulders 24, 25 sit in the tunnel 14 and are pressed against the surfaces of the material sections 7a, 8a and 7b, 8b assigned to them, in each instance, which face the tunnel 14, by the setting device 26.

Subsequently, the tool 20 is driven to rotate about its longitudinal axis L by means of the rotational drive coupled with its central axle 21, and driven to move along the joining seams 13a, 13b in a continuous forward movement. The central axle 21, which now is immersed in the material of the material sections 7a, 8a; 7b, 8b that butt up against one another in the joining seams 13a, 13b, acts as a welding pin, by means of the rotation of which, and the accompanying friction, so much heat is introduced into the relevant material that this softens, mixes, and, after the tool 20 has been moved further, solidifies again, so that the panel elements 1, 2 are connected with one another by means of welding, in a non-releasable, material-fit manner. In this regard, the support shoulders 24, 25 support the material sections 7a, 8a; 7b, 8b, and ensure that proper material mixing occurs in the joining seams 13a, 13b over the entire thickness of the material sections 7a, 8a; 7b, 8b that butt up against one another in them. At the same time, the support shoulders 24, 25, just like the friction shoulders 22, 23, guarantee, at the corresponding outer surface 11, 12 of the panel elements 1, 2, that an optimally level weld seam occurs on the side of the material sections 7a, 8a, 7b, 8b assigned to the tunnel 14.

Figure 5:
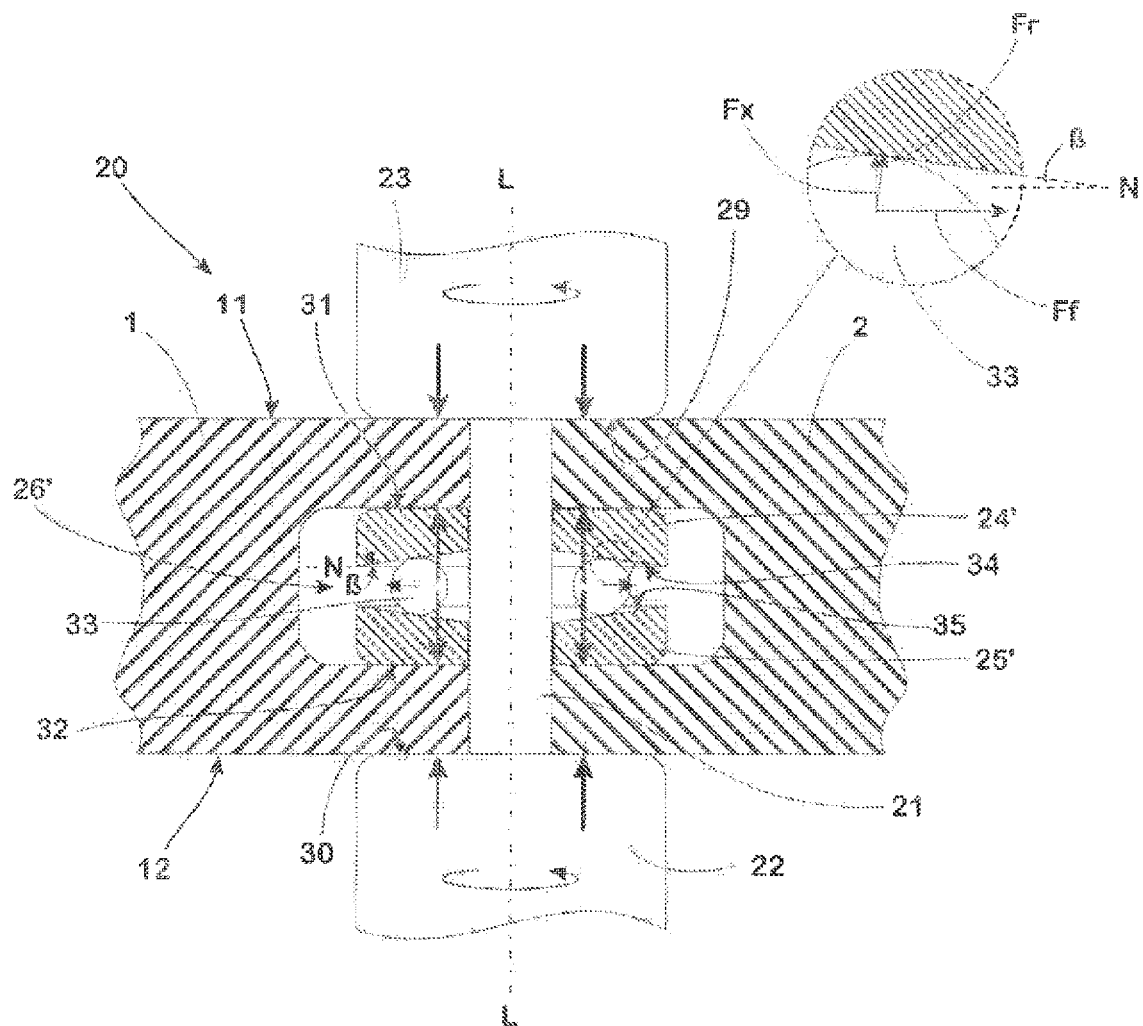
FIG. 5 a tool according to the invention, in a representation corresponding to FIG. 1.

The embodiment, according to the invention, of a tool 20' for friction stir welding, shown in FIG. 5, differs from the tool 20 with regard to the structure of its setting device 26' and of its support shoulders 24', 25'. All the components of the tool 20' that agree with the corresponding components of the tool 20 in terms of their design and function are therefore provided with reference symbols that have already been used for the tool 20.

In the case of the tool 20', the setting device 26' is formed by balls 33 that are loosely arranged between the support shoulders 24', 25'. In this regard, the support shoulders 24', 25' are provided with a conically slanted circumferential slanted surface 34, 35 on their underside; for the remainder, they are formed like the support shoulders 24, 25. This surface drops, in the case of the upper support shoulder 24', proceeding from its inner edge assigned to the central axle 21, in the radial direction, all the way to its outer edge, at an angle ß that is the angle of the normal line N relative to the central axle 21, whereas the slanted surface 35, in the case of the lower support shoulder 25', proceeding from its inner edge assigned to the central axle 21, rises in the radial direction, all the way to its outer edge, also at the angle ß.

During use, the support shoulders 24', 25' connected with the central axle 21 in a torque-proof manner, and with them the balls 33, rotate at a high speed of rotation, so the balls 33 that sit loosely between the support shoulders 24', 25' are driven outward in the radial direction, along the slanted surfaces 34, 35, as the result of the centrifugal forces Ff that are then in effect. Accordingly, the balls 33 exert a resulting force Fres on the slanted surfaces 34, 35, which force results from the centrifugal force Fr and a force Fx oriented axis-parallel to the central axle 21, for which the following equation applies: $Fx = Ff \times \sin(ß) \times \cos(ß)$. As a result of the centrifugal forces Ff that occur during use, the support shoulders 24', 35' are thereby pressed against the surface of the material sections 7a, 8a; 7b, 8b, which surface faces the tunnel 14, with the force Fx that acts axis-parallel to the central axle 21, and thereby they support the material sections 7a, 8a; 7b, 8b during the welding process.

REFERENCE SYMBOLS

- 1, 2 panel elements
- 3, 4 longitudinal sides of the panel elements 1, 2
- 5, 6 recesses of the panel elements 1, 2
- 7a, 7b in the case of horizontal orientation, upper material sections of the panel elements 1, 2
- 8a, 8b in the case of horizontal orientation, lower material sections of the panel elements 1, 2
- 9, 10 crosspieces of the panel elements 1, 2
- 11, 12 outer surface of the panel elements 1, 2
- 13a, 13b joining seams
- 14 tunnel formed by the recesses 5, 6
- 20, 20' tools for friction stir welding of the panel elements 1, 2
- 21 central axle of the tools 20, 20'
- 22, 23 friction shoulders of the tools 20, 20'
- 24, 25 support shoulders of the tool 20
- 24', 25' support shoulders of the tool 20'
- 26 setting device of the tool 20
- 26' setting device of the tool 20'
- 27, 28 plate springs of the setting device 26
- 29-32 contact surfaces of the support shoulders 24, 25 and of the friction shoulders 22, 23
- 33 balls of the setting device 26'
- 34, 35 slanted surface of the support shoulders 24', 25'
- ß angle between the slanted surfaces 34, 35 and the normal line N
- Ff centrifugal forces that act on the balls 33 during use, oriented in the radial direction with reference to the central axle
- Fx forces that act on the support shoulders 24', 25' during use, in the axial direction
- Fres force exerted on the slanted surfaces 34, 35 by the balls 33 during use
- L longitudinal axis of the central axle 21
- LR longitudinal direction of the central axle 21
- N normal line relative to the central axle 21

The invention claimed is:

1. A tool for friction stir welding comprising,
a central axle configured for coupling to a drive device,
a first friction shoulder connected to the central axle,
a second friction shoulder connected to the central axle at a distance from the first friction shoulder in a longitudinal direction of the central axle,
two support shoulders arranged on the central axle between the first friction shoulder and the second friction shoulder, wherein at least one of the two support shoulders is mounted so as to be axially displaceable on the central axle and each support shoulder comprises a slanted surface, and
a setting device arranged between the two support shoulders and configured to exert a force during use on at least the axially displaceable support shoulder, wherein the force is directed in a direction of the friction shoulder arranged most closely adjacent to the axially displaceable support shoulder,
wherein the setting device comprises a setting element that, during use, is driven by means of centrifugal forces in a radial direction, away from the central axle of the tool, and exerts the force against the slanted surface of at least the axially displaceable support shoulder.

2. The tool according to claim 1, wherein the two support shoulders are both mounted on the central axle in an axially displaceable manner, and, during use, the setting device exerts the force against the slanted surfaces of both support shoulders in a direction towards the friction shoulder arranged most closely adjacent to each support shoulder.

3. The tool according to claim 2, wherein the setting device is arranged between the two support shoulders, and, during use, the setting device exerts the force jointly to the slanted surfaces of both support shoulders in a direction towards the friction shoulder arranged most closely adjacent to each support shoulder.

4. The tool according to claim 1, wherein the central axle comprises two or more parts that are coupled to one another with a coupling that does not allow rotation of the parts with respect to one another.

5. The tool according to claim 1, wherein at least one of the two support shoulders is coupled to the central with a coupling that does not allow rotation of the at least one support shoulder with respect to central axle.

6. The tool according to claim 1, wherein at least one of the friction shoulders is coupled to the central axle with a coupling that does not allow rotation of the at least one friction shoulder with respect to central axle.

7. The tool according to claim 1, wherein the friction shoulders, the support shoulders, and the setting device are oriented coaxially with reference to the central axle.

8. The tool according to claim 1, wherein end faces of the friction shoulders face one another and are ring-shaped.

9. The tool according to claim 1, wherein the support shoulders are shaped as ring disks.

10. A method for producing panels comprising two panel elements pre-fabricated from a weldable material, wherein each panel element has a recess comprising a channel on a side surface and the recesses of the panel elements are arranged opposite to one another, the method comprising:
providing the two panel elements;
joining the panel elements such that the side surfaces of each panel element provided with the recesses butt up against one another, and a tunnel is formed by the recesses, wherein the tunnel is delimited on a top side and a bottom side when the panel elements are in a horizontal orientation by material sections of each of the panel elements that define the top side and material sections of each of the panel elements that define the bottom side, wherein the material sections of each of the panel elements defining the top side butt up against one another in a first joining seam, and the material sections of each of the panel elements defining the bottom side butt up against one another in a second joining seam; and friction stir welding the panel elements using the tool of claim 1, wherein the central axle acts as a welding pin and the tool is guided along the joining seams between the panel elements, the first friction shoulder acts on a free surface on a top side of the panel elements, and the second friction shoulder acts on a free surface on a bottom side of the panel elements, the support shoulders are arranged in the tunnel, and at least one of the support shoulders is pressed by the setting device against surfaces of the material sections of the panel elements that face the tunnel and butt up against one another to form a joining seam.

11. The method according to claim 10, wherein the support shoulders are coupled with the central axle with couplings that do not allow rotation of the support shoulders with respect to central axle, so that during friction stir welding, the material sections are subjected to friction stir stress on a free outer surface of the material sections that face away from the tunnel and on a surface of the material sections that face the tunnel.

12. The method according to claim 10, wherein the panel elements consist of a light metal material.

* * * * *

UNITED STATES PATENT AND TRADEMARK OFFICE
CERTIFICATE OF CORRECTION

| | |
|---|---|
| PATENT NO. | : 11,845,142 B2 |
| APPLICATION NO. | : 17/431459 |
| DATED | : December 19, 2023 |
| INVENTOR(S) | : Sven Schueddekopf |

It is certified that error appears in the above-identified patent and that said Letters Patent is hereby corrected as shown below:

In the Claims

Column 10, Line 46, Claim 5, after "central" insert -- axle --

Signed and Sealed this
Twentieth Day of February, 2024

Katherine Kelly Vidal
*Director of the United States Patent and Trademark Office*